United States Patent
Okada et al.

(10) Patent No.: US 11,994,875 B2
(45) Date of Patent: May 28, 2024

(54) CONTROL DEVICE, CONTROL METHOD, AND CONTROL SYSTEM

(71) Applicant: HONDA MOTOR CO., LTD., Tokyo (JP)

(72) Inventors: Shogo Okada, Tokyo (JP); Shota Moriya, Tokyo (JP); Ayako Kishi, Wako (JP); Junya Onishi, Wako (JP); Yuki Takebe, Wako (JP); Kayono Kamimura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 171 days.

(21) Appl. No.: 17/675,466

(22) Filed: Feb. 18, 2022

(65) Prior Publication Data
US 2022/0300012 A1  Sep. 22, 2022

(30) Foreign Application Priority Data

Mar. 16, 2021 (JP) .................. 2021-042698

(51) Int. Cl.
*G05D 1/00* (2006.01)
(52) U.S. Cl.
CPC ............. *G05D 1/0297* (2013.01); *G05D 1/00* (2013.01); *G05D 1/0246* (2013.01)
(58) Field of Classification Search
CPC .. G05D 1/0297; G05D 1/0246; G05D 1/0282; G05D 2201/0211; G05D 1/0251; G05D 1/0223; G05D 1/0285; G05D 2201/02; B25J 11/008; G06Q 30/06
See application file for complete search history.

(56) References Cited

U.S. PATENT DOCUMENTS

| | | | | |
|---|---|---|---|---|
| 2004/0084527 | A1* | 5/2004 | Bong ................. | G06Q 30/0639 235/382 |
| 2005/0151842 | A1* | 7/2005 | Oohashi ................. | G06V 20/10 348/86 |
| 2005/0222712 | A1* | 10/2005 | Orita ....................... | G10L 15/26 704/E15.045 |
| 2011/0145053 | A1* | 6/2011 | Hashim-Waris ....... | G16H 80/00 705/26.1 |
| 2017/0282374 | A1* | 10/2017 | Matula ..................... | B25J 3/00 |
| 2018/0068177 | A1* | 3/2018 | Sakai ................. | G06Q 30/0617 |
| 2018/0075403 | A1* | 3/2018 | Mascorro Medina ....................... B25J 9/1697 |
| 2018/0259973 | A1* | 9/2018 | Maruo ................... | G05D 1/102 |

(Continued)

FOREIGN PATENT DOCUMENTS

JP             6142306 B2      6/2017

*Primary Examiner* — Sohana Tanju Khayer
(74) *Attorney, Agent, or Firm* — Thomas| Horstemeyer, LLP

(57) ABSTRACT

A control device that controls a robot capable of self-propelling is provided. The control device comprises: a facility staff member identifying unit configured to identify a position of a facility staff member in a facility; a visitor identifying unit configured to identify a position of a visitor in the facility; and a control unit configured to instruct the robot capable of self-propelling to move. In a case where the control unit determines that the facility staff member that has been identified by the facility staff member identifying unit is absent in a predetermined range near the visitor that has been identified by the visitor identifying unit, the control unit causes the robot to move into the predetermined range.

11 Claims, 7 Drawing Sheets

(56) References Cited

U.S. PATENT DOCUMENTS

| | | | |
|---|---|---|---|
| 2019/0206400 A1* | 7/2019 | Cui | G10L 15/1815 |
| 2019/0279070 A1* | 9/2019 | Hayashi | B25J 5/00 |
| 2020/0033135 A1* | 1/2020 | Huh | G06V 40/172 |
| 2020/0053324 A1* | 2/2020 | Deyle | G05D 1/0088 |
| 2020/0097895 A1* | 3/2020 | Deng | B25J 9/1689 |
| 2020/0189117 A1* | 6/2020 | Ha | B25J 9/1669 |
| 2020/0198150 A1* | 6/2020 | Theobald | G06Q 50/12 |
| 2020/0206940 A1* | 7/2020 | Takada | A63H 11/00 |
| 2021/0053233 A1* | 2/2021 | Hatayama | G06V 20/20 |
| 2021/0080926 A1* | 3/2021 | Rubinson | G05B 19/4061 |
| 2021/0174370 A1* | 6/2021 | Yim | B25J 11/0045 |

\* cited by examiner

FIG. 6

```
S3 START
   ↓
EXTRACT PERSON FROM IMAGE — S31
   ↓
ACQUIRE VISITOR INFORMATION — S32
   ↓
IDENTIFY VISITOR AND THEIR POSITION — S33
   ↓
S3 END
```

FIG. 7

| USER STATE | SCORE |
|---|---|
| SMILING | -5 |
| TALKING | -10 |
| MAKING PHONE CALL | -10 |
| OPERATING SMARTPHONE | -3 |
| CRYING WITH TEARS | +5 |
| LOOKING AROUND | +13 |
| SHAKING LEGS | +5 |
| HAVING REMAINING AMOUNT OF DRINK EQUAL TO OR SMALLER THAN THRESHOLD | +10 |
| HAVING ANGRY FACE | +5 |

CONTROL DEVICE, CONTROL METHOD, AND CONTROL SYSTEM

CROSS-REFERENCE TO RELATED APPLICATION(S)

This application claims priority to and the benefit of Japanese Patent Application No. 2021-042698 filed on Mar. 16, 2021, the entire disclosure of which is incorporated herein by reference.

BACKGROUND OF THE INVENTION

Field of the Invention

The present invention relates to a control device, a control method, and a control system for a robot capable of self-propelling.

Description of the Related Art

Various techniques related to a robot control system using a guide robot have been proposed (Japanese Patent No. 6142306). In the robot control system disclosed in Patent Document 1, a guide robot (communication robot), for example, asks visitors requirements, or guides the visitors in an exhibition hall.

SUMMARY OF THE INVENTION

Here, in order to purchase a predetermined product or receive a service, in a facility where visitors have to wait inside the facility, the visitors have too much time in the facility, in some cases. For this reason, for the facility side, it is desirable to appropriately serve the visitors, and there is a demand for a technology by which the facility side is capable of appropriately serving the visitors with use of guide robots, which are a limited.

The present invention has an object to provide a guide robot that appropriately serves visitors.

According to one aspect of the present invention, there is provided a control device that controls a robot capable of self-propelling, the control device including: a facility staff member identifying unit configured to identify a position of a facility staff member; a visitor identifying unit configured to identify a position of a visitor; and a control unit configured to instruct the robot capable of self-propelling to move, in which in a case where the control unit determines that the facility staff member that has been identified by the facility staff member identifying unit is absent within a predetermined range near the visitor that has been identified by the visitor identifying unit, the control unit causes the robot to move into the predetermined range.

In addition, according to one aspect of the present invention, there is provided a control method performed by a control device that controls a robot capable of self-propelling, the control method including: identifying a position of a facility staff member; identifying a position of a visitor; and instructing the robot capable of self-propelling to move, in which in the instructing step, in a case where the facility staff member that has been identified by the identifying step is absent within a predetermined range near the visitor that has been identified by the identifying step, the robot is instructed to move into the predetermined range.

BRIEF DESCRIPTION OF THE DRAWINGS

FIG. 6 is a flowchart illustrating an example of a visitor identification processing in FIG. 5;

FIG. 7 is a diagram illustrating an example of a table for estimating a state of a visitor;

DESCRIPTION OF THE EMBODIMENTS

Figure 2:
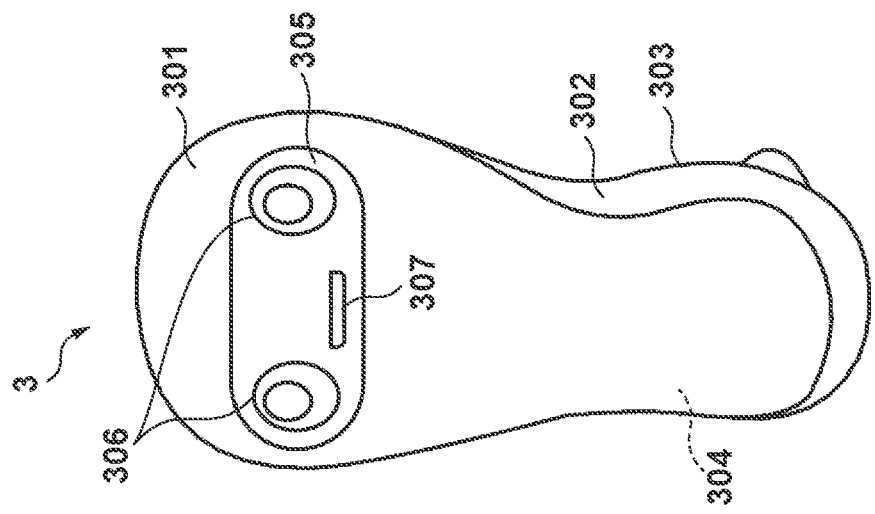
FIG. 2 is a perspective view schematically illustrating a guide robot in FIG. 1.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

Hereinafter, a robot management apparatus according to the present embodiment will be described with reference to FIGS. 1 to 9. The robot management apparatus according to the present embodiment determines whether it is necessary to dispatch a guide robot to a person that has been detected, based on an in-facility image captured by an imaging unit installed in a facility such as a store. For example, in a case where the detected person is a guest such as a visitor, and no facility staff member, store staff member, guide robot, or the like is present in the surroundings of the detected guest, and it is determined that it is necessary to serve the guest, the guide robot is dispatched to the guest's location.

In this manner, the guide robot is dispatched to the guest who has to be served, and communicates with the guest. Therefore, it is possible to prevent the guest from feeling stress since no facility staff member is aware of presence of the guest, or spending too much time waiting.

Examples of the facility using the above-described guide robot may include a store that retails various types of products, art-related facilities such as an art museum, a museum, an art gallery, and a gallery, a science museum, a memorial hall, an exhibition, a workshop, and the like. Examples of the store that retails various types of products may include a department store, a supermarket, a specialized store, and the like. Examples of specialized stores may include various specialized dealers and automobile dealers. In addition, in the automobile dealers, various services other than automobile sales, such as automobile maintenance and car leasing, are offered. In the following embodiment, a description will be given with regard to an example in which a robot management apparatus is constituted by a control server. Such a control server is installed in an automobile dealer, and a guide robot arranged in a showroom of the automobile dealer is dispatched to a visitor who comes to the showroom.

Figure 1:
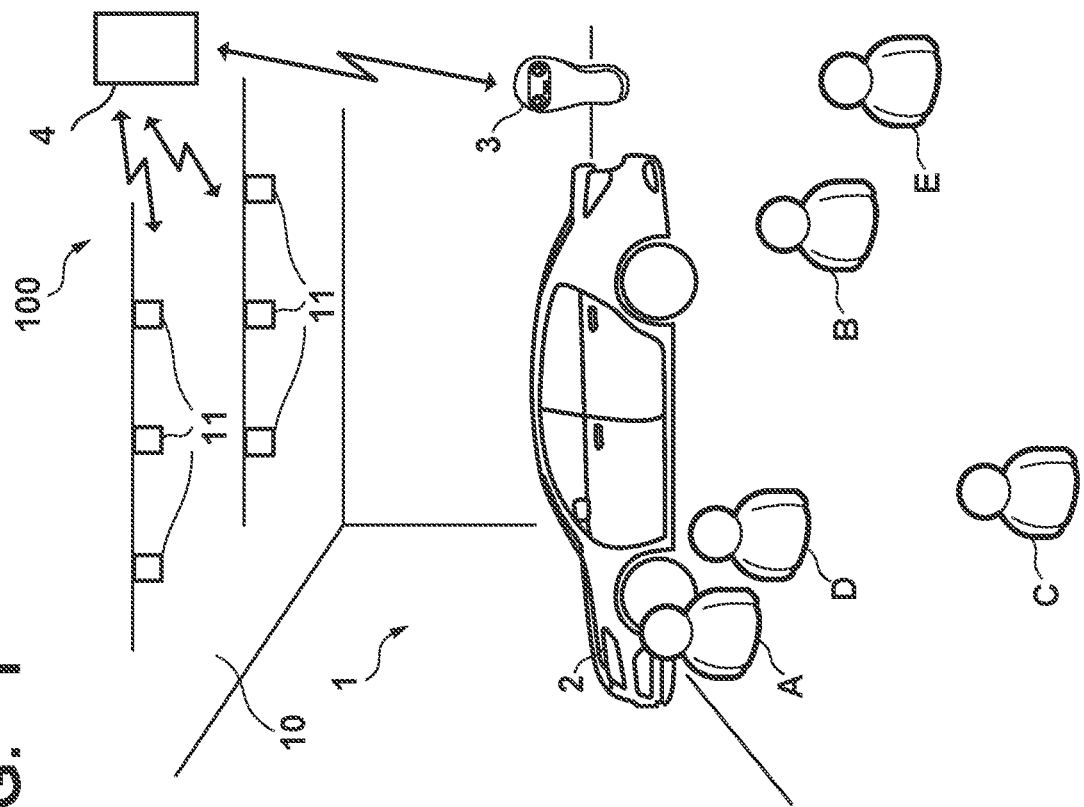
FIG. 1 is a schematic configuration diagram of a robot management system according to the present embodiment.

FIG. 1 is a schematic configuration diagram of a robot management system 100 using a control server 4 constituting a robot management apparatus according to an embodiment of the present invention. As illustrated in FIG. 1, in the robot management system 100 using a server device (control server) 4 according to the present embodiment, a guide robot 3 capable of self-propelling is arranged in a showroom 1 of an automobile dealer where an exhibition vehicle 2 is exhibited. Then, a visitor who visits the showroom 1 is identified from in-showroom images captured by each of a plurality of imaging apparatuses 11 installed on a ceiling 10 of the showroom 1. For example, visitors and show room staff members (facility staff members) are respectively identified based on face images of the respective visitors who appear in the in-showroom images. In addition, for example, the respective visitors and the show room staff members (facility staff members) are identified, based on the respective face images of the plurality of visitors who appear in the in-showroom images.

Furthermore, it is determined whether any showroom staff member is present near the visitor from the in-showroom images, and the guide robot is controlled to move to the visitor's location where no facility staff member is present nearby.

For example, as illustrated in FIG. 1, in a case where three visitors A, B, and C visit the showroom 1 in which facility staff members (staff) D and E are present, the server device 4 identifies the three visitors A, B, and C and the staff members D and E from the in-showroom images that have been captured by the plurality of imaging apparatuses 11. For example, the server device 4 may determine that a person who wears specific clothes such as a uniform is a staff member, and the other persons are visitors. Then, it is assumed that the staff member D serves the visitor A and the staff member E serves the visitor B, but no staff member serves the visitor C.

Here, a description will be given with regard to the guide robot 3 with reference to FIG. 2. FIG. 2 is a perspective view schematically illustrating the guide robot 3 constituting the robot management system 100 illustrated in FIG. 1. As illustrated in FIG. 2, the guide robot 3 is formed in an upright and substantially gourd shape, and an upper part constitutes a head portion 301, and a lower part constitutes a body portion 303 with a narrowed portion 302 as the center. In the guide robot 3, the head portion 301 is formed to be substantially two heads tall (the ratio of the head of the guide robot 3 and total height of the guide robot 3 is substantially 1 to 2) so to be slightly larger than the body portion 303, and has an attractive and warm shape as a whole. In the present embodiment, the guide robot 3 has a height of about 110 cm.

Further, the guide robot 3 has no limbs, and is configured to be movable in any direction by 360 degrees such as front, back, left, right, and oblique directions using a traveling device 304 provided at a lower end of the body portion 303. Note that the description of the specific configuration of the traveling device 304 is omitted here. As described above, the head portion 301 is slightly larger than the body portion 303, and has a shape without limbs, so that the guide robot 3 has, for example, a shape that a child can easily hold and that easily communicates with the child. In addition, the traveling device 304 of the guide robot 3 is capable of moving while swinging in a front-and-rear direction and a left-and-right direction, so visitors can easily notice its approach and the like. The guide robot 3 is capable of moving to easily communicate with the visitors.

The head portion 301 of the guide robot 3 is provided with a substantially elliptical face portion 305 that is long in the horizontal direction, and the face portion 305 is configured to be capable of displaying an expression of the guide robot 3, a simple character image, and the like. In the present embodiment, a pair of dummy eyes 306 representing eyes are displayed on the face portion 305 of the guide robot 3, and such a pair of dummy eyes 306 are capable of making various expressions. For example, the shapes of the pair of dummy eyes 306 are changed so that the expressions such as delight, anger, sorrow, and pleasure can be made. In the present embodiment, a dummy mouth 307 expressing the mouth is further displayed. The shapes of the pair of dummy eyes 306 and the dummy mouth 307 are changed so that the expression is easily understandable.

In addition, regarding the guide robot 3, the positions of the pair of dummy eyes 306 are configured to be movable in the face portion 305. The guide robot 3 changes the positions of the pair of dummy eyes 306 in the face portion 305 so as to expresses actions of moving its line of sight. The guide robot 3 changes the positions of the pair of dummy eyes 306 in front of a visitor to express the actions of moving its line of sight, and guides the visual line of the visitor. In this situation, the guide robot 3 is caused to make a rotating action or the like in conjunction with the movements of its line of sight, so it becomes easier to guide the visual line of the visitor.

The guide robot 3 formed as described above is dispatched to the visitor's location so as to offer simple guidance, such as asking a requirement of a visit, asking the visitor's desire for a drink to be served, and asking by which facility staff member the visitor desires to be served. In addition, an image of a visitor is acquired, and it is determined that the visitor has visited in the past. Accordingly, the facility staff member can grasp information on a product that has been sold or a service that has been offered in the past, and the quality in serving by the facility staff member can be improved. In order to satisfactorily realize the provision of such a robot dispatch guide service in the automobile dealer, in the present embodiment, the robot management system 100 using the server device 4 to be described below is configured.

Figure 3:
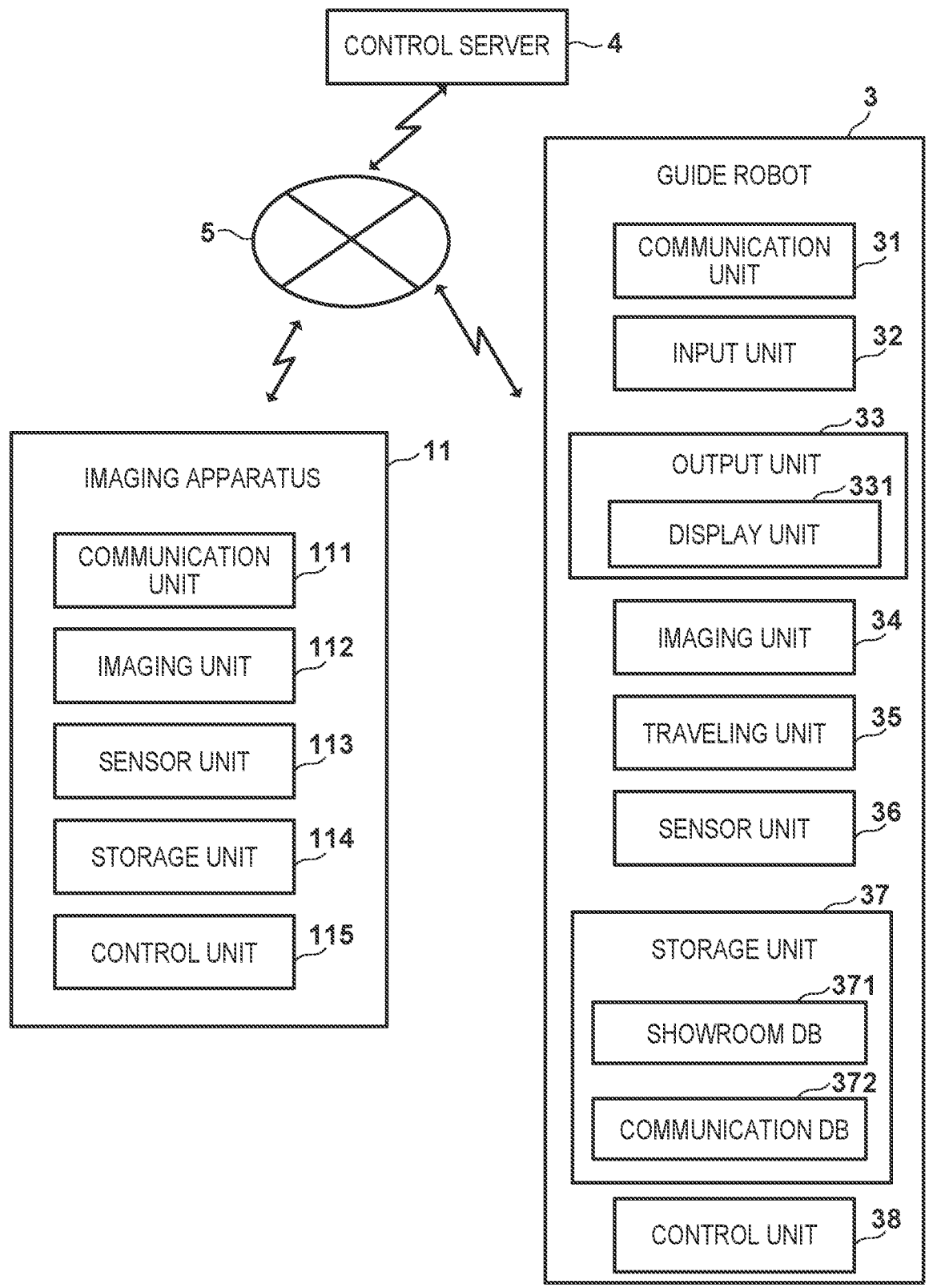
FIG. 3 is a block diagram illustrating a configuration of a robot management system in FIG. 1.
Figure 4:
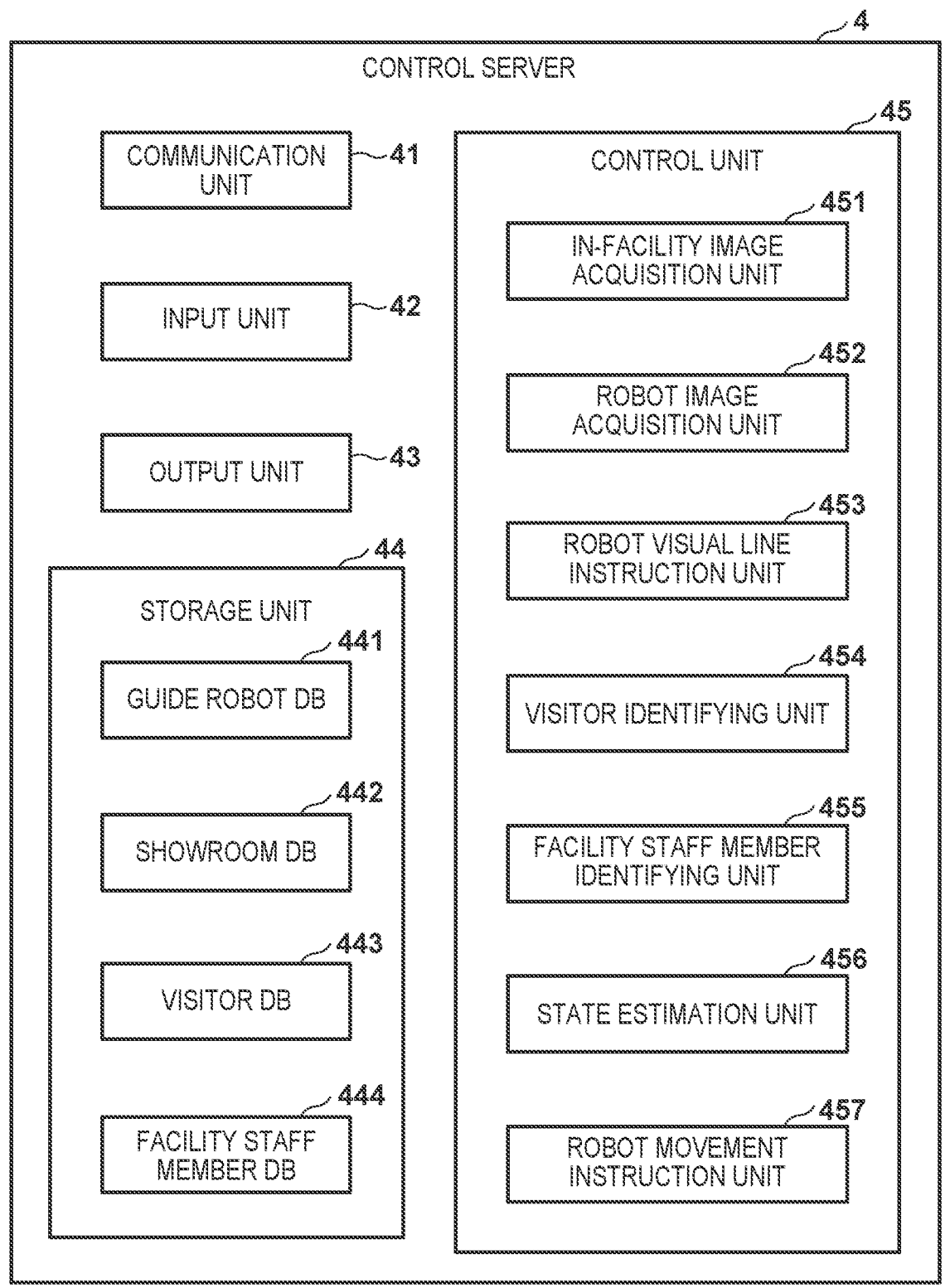
FIG. 4 is a block diagram illustrating a configuration of a control server in FIG. 3.

FIG. 3 is a block diagram illustrating a configuration of a main part of the robot management system 100 illustrated in FIG. 1. FIG. 4 is a block diagram illustrating a configuration of a main part of the server device 4 illustrated in FIG. 3. As illustrated in FIG. 1, the robot management system 100 according to the present embodiment includes the imaging apparatuses 11 installed on the ceiling 10 of the showroom 1 in an automobile dealer, the guide robot 3 capable of self-propelling and arranged in the showroom 1, and the server device 4 included in the automobile dealer.

As illustrated in FIG. 3, the imaging apparatus 11, the guide robot 3, and the server device 4 are connected with a communication network 5, such as a wireless communication network, the Internet, or a telephone network. Only one imaging apparatus 11 is illustrated in FIG. 3 for simplification. However, in fact, a plurality of imaging apparatuses 11 are present as illustrated in FIG. 1. Similarly, only one guide robot 3 is illustrated in FIG. 3. However, a plurality of guide robots 3 can be arranged.

As illustrated in FIG. 3, the imaging apparatus 11 includes a communication unit 111, an imaging unit 112, a sensor unit 113, a storage unit 114, and a control unit 115. The communication unit 111 is configured to be wirelessly communicable with the server device 4 and the guide robot 3 through the communication network 5. The imaging unit 112 is a camera having an imaging element such as a CCD or a CMOS, and is configured to be capable of imaging a visitor who has come to the showroom 1. The sensor unit 113 is a sensor such as a moving object detection sensor or a human detection sensor, and is configured to be capable of detecting a position and a movement of a visitor who has come to the showroom 1. A plurality of imaging units 112 and a plurality of sensor units 113 are arranged on the ceiling 10 of showroom 1 in order to be capable of imaging and detecting a visitor who visits the showroom 1, even when the visitor is present at any position in the showroom 1.

The storage unit 114 includes a volatile or nonvolatile memory, not illustrated. The storage unit 114 stores various programs executed by the control unit 115, data, and the like. For example, the storage unit 114 temporarily stores in-showroom images that have been captured by the imaging unit 112 and the position information on the visitor that has been detected by the sensor unit 113.

The control unit 115 includes a CPU, performs a predetermined processing, based on a signal that has been received from the outside of the imaging apparatus 11 via the communication unit 111 and various programs and the like stored in the storage unit 114, and outputs a predetermined control signal to the communication unit 111, the imaging unit 112, the sensor unit 113, and the storage unit 114.

For example, the control unit 115 transmits an image that has been captured by the imaging unit 112 and a position of a person such as a visitor or a facility staff member that has been detected by the sensor unit 113 to the server device 4 at a predetermined cycle. Alternatively, in response to an imaging instruction from the server device 4, the imaging unit 112 captures an image, the sensor unit 113 detects the position of the visitor, and transmits the image and position information to the server device 4. This enables the server device 4 to acquire the image in the showroom 1 (in-showroom image). The server device 4 analyzes the in-showroom image, and becomes capable of recognizing the visitor and the facility staff member included in the image that has been acquired.

As illustrated in FIG. 3, the guide robot 3 includes, as a functional configuration, a communication unit 31, an input unit 32, an output unit 33, an imaging unit 34, a traveling unit 35, a sensor unit 36, a storage unit 37, and a control unit 38. The communication unit 31 is configured to be wirelessly communicable with the server device 4 and the imaging apparatus 11 through the communication network 5. The input unit 32 includes various switch buttons (not illustrated) that can be operated at the time of maintenance or the like, a microphone (not illustrated) capable of inputting voices of a visitor, and the like.

The output unit 33 includes a speaker (not illustrated) capable of outputting sound, and a display unit 331 capable of displaying an image. The display unit 331 constitutes the above-described face portion 305 of the guide robot 3, and the above-described pair of dummy eyes 306, character images, and the like are displayed on the display unit 331. It is only necessary if the display unit 331 is configured to be capable of displaying the pair of dummy eyes 306, a character image, and the like. The display unit 331 is configured with, for example, a liquid crystal panel, a projector, a screen, or the like.

The imaging unit 34 is a camera including an imaging element such as a CCD or a CMOS, and is configured to be capable of imaging a visitor who has come to the showroom 1. The imaging unit 34 is provided, for example, on the head portion 301 of the guide robot 3. The provision of the imaging unit 34 on the head portion 301 facilitates imaging the visitor's face. In addition, the imaging unit 34 is preferably provided near the pair of dummy eyes 306 of the guide robot 3 in terms of imaging the visitor's face.

The traveling unit 35 is configured with the above-described traveling device 304 that causes the guide robot 3 to self-propel. The traveling unit 35 includes a battery and a motor, and is configured to drive the motor with electricity of the battery and to travel. The traveling unit 35 can be configured with a known electric technique. The sensor unit 36 includes various sensors including a sensor that detects a traveling state and a stop state of the guide robot 3, such as a traveling speed sensor, an acceleration sensor, and a gyro sensor, and a sensor that detects a surrounding situation of the guide robot 3, such as an obstacle sensor, a human detection sensor, and a moving object sensor.

The storage unit 37 includes a volatile or nonvolatile memory, not illustrated. The storage unit 37 stores various programs executed by the control unit 38, various data, and the like. In addition, the storage unit 37 temporarily stores data and the like regarding contents for serving visitors. For example, the visitor's requirement that has been asked by the guide robot 3, the explanation to the visitor that has been given by the guide robot 3, and the like are temporarily stored.

The storage unit 37 stores a showroom database 371 and a communication database 372, as an example of a functional configuration achieved by a memory. For example, data corresponding to the arrangement of the exhibition vehicle 2, a table, and the like arranged in the showroom 1 is stored in the showroom database 371. The showroom database 371 is referred to, when the guide robot 3 moves in the showroom. The communication database 372 stores data and the like corresponding to a voice recognition processing or a voice output processing for the guide robot 3 to communicate with the visitor. The communication database 372 is referred to, when the guide robot 3 communicates with the visitor.

The control unit 38 includes a CPU, performs a predetermined processing, based on a signal that has been received from the outside of the guide robot 3 via the communication unit 31, a signal that has been input via the input unit 32, a signal that has been detected by the sensor unit 36, various programs and data stored in the storage unit 37, and outputs a predetermined control signal to the communication unit 31, the output unit 33, the imaging unit 34, the traveling unit 35, and the storage unit 37.

For example, the control unit 38 outputs a control signal to the traveling unit 35 and the storage unit 37, based on the signal that has been received from the server device 4 via the communication unit 31 and the signal that has been detected by the sensor unit 36. With this processing performed by the control unit 38, the guide robot 3 is dispatched to the visitor's location. Further, for example, the control unit 38 outputs a control signal to the imaging unit 34 and the communication unit 31, based on the signal that has been received from the server device 4 via the communication unit 31. With this processing performed by the control unit 38, an image of the visitor's face is captured, and the captured face image is transmitted to the server device 4.

Further, for example, the control unit 38 outputs a control signal to the output unit 33 (the display unit 331), based on the signal that has been received from the server device 4 via the communication unit 111. With this processing performed by the control unit 38, the expression of the guide robot 3 is changed, or the line of sight of the pair of dummy eyes 306 are changed. Further, for example, the control unit 38 outputs a control signal to the output unit 33 and the storage unit 37, based on a signal that has been received via the input unit 32. With this processing performed by the control unit 38, the guide robot 3 becomes capable of communicating with the visitor.

As illustrated in FIG. 4, the server device 4 includes a communication unit 41, an input unit 42, an output unit 43, a storage unit 44, and a control unit 45. The server device 4 can be configured with use of a virtual server function on a cloud, or can be configured by distributing the functions.

The communication unit 41 is configured to be wirelessly communicable with the imaging apparatus 11 and the guide robot 3 through the communication network 5 (see FIG. 3). The input unit 42 includes various switches that can be operated by the user, such as a touch panel and a keyboard, a microphone that can input voices, and the like. Note that in the present embodiment, the user mentioned here is a store clerk (facility staff member) of the automobile dealer. The output unit 43 includes, for example, a monitor capable of displaying characters and images, a speaker capable of outputting sound, and the like.

The storage unit 44 includes a volatile or nonvolatile memory, not illustrated. The storage unit 44 stores various programs executed by the control unit 45, various data, and the like. The storage unit 44 includes a guide robot database (DB) 441, a showroom DB 442, a visitor DB 443, and a facility staff member DB 444, as functional configurations achieved by the memory.

The guide robot DB 441 stores basic information, maintenance information, and the like, regarding the guide robot 3, such as a robot ID of the guide robot 3 used for the robot dispatch guide service. The showroom DB 442 stores data corresponding to the arrangements of the exhibition vehicle 2, the table, and the like arranged in the showroom 1. Note that the showroom database 442 has a configuration similar to that of the showroom database 371 stored in the storage unit 37 included in the guide robot 3, and either one may be included. Further, the showroom DB 442 stores the positions and orientations of the imaging apparatuses 11 arranged in the showroom 1.

The visitor DB 443 stores visitor information about the visitor who visits the showroom 1. The visitor information includes a face image of the visitor, a visit history, and the like, in addition to basic information about the visitor such as address, name, age, occupation, and gender of the visitor. The visit history includes chatting before purchase negotiation and the like, in addition to contents of the purchase negotiation at the time of visit.

In addition, the visitor DB 443 may store a visiting flag indicating a visitor who has visited the showroom 1 and information indicating a staying time in the showroom 1. In one example, a visitor or a facility staff member inputs information about a requirement for every visitor via the guide robot 3 or an external device at a reception or the like. Accordingly, information indicating the staying time in the showroom 1 can be acquired. In addition, in a case where a visitor visits in a visitor group, the visitor DB 443 may store the visitor in association with the visitor group. For example, in a case where a visitor visits in a family group, such a visitor can be stored in association with the family group, and in a case where the visitor visits in a friend group, such a visitor can be stored in association with the friend group. As described above, the visitor belongs to a plurality of groups, in some cases, and a visitor map may be created in the visitor DB 443.

The control unit 45 includes a processor such as a CPU, performs a predetermined processing based on a signal that has been received via the input unit 42, a signal that has been received from the outside of the server device 4 via the communication unit 41, various programs, various data, and the like stored in the storage unit 44, and outputs a control signal to the communication unit 41, the output unit 43, and the storage unit 44.

As illustrated in FIG. 4, the control unit 45 includes, an in-facility image acquisition unit 451, a robot image acquisition unit 452, a robot visual line instruction unit 453, a visitor identifying unit 454, a facility staff member identifying unit 455, a state estimation unit 456, and a robot movement instruction unit 457, as functional configurations achieved by the processor.

The in-facility image acquisition unit 451 acquires the in-showroom images that have been captured by the plurality of imaging apparatuses 11 installed in the showroom 1. Specifically, the in-facility image acquisition unit 451 receives inputs of data of images (including a still image and a moving image) inside the showroom 1 (a space where the exhibition vehicle 2 is exhibited) that has been captured by the plurality of imaging apparatuses 11 via the communication unit 41. In the present embodiment, the in-facility image acquisition unit 451 causes the plurality of imaging apparatuses 11 to respectively capture in-showroom images, and acquires the in-showroom images that have been captured. Specifically, the in-facility image acquisition unit 451 outputs control signals for respectively causing the plurality of imaging apparatuses 11 to image the showroom 1 via the communication unit 41, and receive inputs of data of the in-showroom images that have been respectively captured by the plurality of imaging apparatuses 11 via the communication unit 41.

The robot image acquisition unit 452 acquires an image including a face image of the visitor that has been captured by the guide robot 3 arranged in the showroom 1. Specifically, the robot image acquisition unit 452 receives inputs of data of images (including a still image and a moving image) including the face image of the visitor that has been captured by the guide robot 3 via the communication unit 41. In the present embodiment, the robot image acquisition unit 452 causes the guide robot 3 to capture an image of the visitor's face, and acquires an image including the face image that has been captured. Specifically, the robot image acquisition unit 452 outputs a control signal for causing the guide robot 3 to image the visitor's face via the communication unit 41, and receives inputs of the data of images including the face image of the visitor that has been captured by the guide robot 3 via the communication unit 41.

The robot visual line instruction unit 453 instructs the directions of the line of sight of the pair of dummy eyes 306, of the guide robot 3. Specifically, the robot visual line instruction unit 453 outputs a control signal for instructing the positions and movements of the pair of dummy eyes 306 of the guide robot 3 to the guide robot 3 via the communication unit 41.

Upon reception of an input of the control signal via the communication unit 31, the guide robot 3 controls the display unit 331, based on the control signal that has been input to change the positions of the pair of dummy eyes 306. That is, the guide robot 3 moves its visual line. When the guide robot 3 moves its visual line, the visitor follows the visual line of the guide robot 3, and looks at the direction of the visual line of the guide robot 3. As described above, the guide robot 3 moves its visual line, and is capable of guiding the visual line of the visitor to encourage a change in the position or the posture of the visitor. For example, the visual line of the guide robot 3 is directed to an imaging apparatus 11, so that the visual line of the visitor can be directed to the imaging apparatus 11. Then, when the visitor looks at the imaging apparatus 11, the imaging apparatus 11 is capable of capturing the visitor's face.

The visitor identifying unit 454 identifies a visitor who has visited the showroom 1 from the in-showroom image that has been acquired by the in-facility image acquisition unit 451. For example, the visitor identifying unit 454 extracts a person from the in-showroom image, and further extracts (recognizes) a face image from the person that has been extracted. Then, the visitor identifying unit 454 searches the visitor data stored in the visitor database 443 for visitor data having a face image that matches the face image that has been extracted, and identifies the visitor. In a case where there is no visitor data having the face image that matches the face image that has been extracted, the face image is stored in the visitor database 443 as a new visitor.

In addition, in a case where the visitor identifying unit 454 cannot extract (recognize) the face image from the person that has been extracted from the in-showroom image, and determines that the visitor is unidentifiable, the visitor identifying unit 454 outputs a control signal to the robot movement instruction unit 457. Upon reception of an input of the control signal, the robot movement instruction unit 457 instructs the guide robot 3 to move so that the guide robot 3 is dispatched to such a person's location. Then, the robot image acquisition unit 452 causes the guide robot 3 to capture an image of such a person's face. The image including a face image of such a person that has been captured by the guide robot 3 is input into the robot image acquisition unit 452 via the communication unit 41, and the visitor identifying unit 454 identifies the visitor in a similar method as described above by using the face image of the person that has been input into the robot image acquisition unit 452.

In addition, the visitor identifying unit 454 identifies the position of a person that has been extracted from the in-showroom image. For example, the control server 4 may store the position and an imaging range of the imaging apparatus 11 arranged in the facility in the showroom DB 442, and may identify the position of the visitor based on the in-showroom image and the position and the imaging range of the imaging apparatus 11 that has captured the image. Alternatively, a person may be detected, based on sensor information that has been acquired from the sensor unit 113 of the imaging apparatus 11, and whether the person who has been detected is a visitor may be determined, based on the in-showroom image that has been acquired from the imaging unit 112 of the imaging apparatus 11.

The facility staff member identifying unit 455 performs, for example, an image recognition processing on the in-showroom image that has been acquired from the imaging apparatus 11, and detects that a facility staff member appears in the in-showroom image. For example, the control server 4 may determine which facility staff member is the person who appears in the in-showroom image, based on the face image of the facility staff member stored in the facility staff member DB 444. Alternatively, the facility staff member identifying unit 455 may determine whether the person who appears in the in-showroom image is a facility staff member, based on a predetermined marker such as a uniform or an accessory of the facility staff member. Note that, similarly to the visitor identifying unit 454, the facility staff member identifying unit 455 may detect a person, based on the sensor information that has been acquired from the sensor unit 113, and may determine whether the person who has been detected is a facility staff member, based on the in-showroom image that has been acquired from the imaging unit 112.

Further, in a case where the facility staff member carries a transmitter, the facility staff member identifying unit 455 may acquire position information on the transmitter or signal intensity of a reference signal that has been transmitted from the transmitter from a plurality of receivers (not illustrated) provided in the facility, and may identify the position of the facility staff member.

The state estimation unit 456 estimates a state of the visitor that has been identified by the visitor identifying unit 454, including a visitor's emotion. For example, the visitor's emotion such as smiling, being angry, or the like is estimated, based on the face image of the visitor that has been acquired from at least one of the imaging apparatus 11 and the guide robot 3. Further, the state estimation unit 456 detects that the visitor is taking a gesture such as looking around or acting restless, based on the moving image of the visitor, and estimates that the visitor is in a state of needing to be served, such as anxiety or anger. Further, the state estimation unit 456 detects that a remaining amount of a drink held by the visitor is small, and estimates that the visitor is thirsty, that is, the drink is additionally needed.

The emotion of each visitor can be estimated based on the gesture, behavior, or the like of the visitor. For example, the visitor's emotion is estimated from the face image of the visitor that has been extracted from the in-showroom image, the action of the visitor, or the like. For example, when the visitor has an angry face, looks around, is acting restless, or the like, it is estimated that the visitor is in a bad mood. On the other hand, when the visitor has a joyful look or when the visitors are making conversation with each other, it is estimated that the visitor is in a good mood.

The robot movement instruction unit 457 instructs the guide robot 3 to move so that the guide robot 3 is dispatched to the visitor's place, based on a positional relationship between the visitor and the facility staff member that has been identified by the visitor identifying unit 454 and the facility staff member identifying unit 455. Specifically, the robot movement instruction unit 457 transmits, via the communication unit 41 to the guide robot 3, control information including information about a movement route on which the guide robot 3 should move. The information about the movement route may include information about a destination of the guide robot 3 and information about an action of the guide robot 3, such as traveling straight, and rotating to the right by 30 degrees.

In this situation, upon reception of an instruction to stay on the spot while moving on the movement route that has been instructed by the control server 4, the robot movement instruction unit 457 stops moving on the movement route and stays on the spot. This enables the guide robot 3 to move to near the visitor who is in a bad mood or needs to be served, and to communicate with the visitor, so it becomes possible to prevent the visitor's emotion from getting worse.

Further, when the visitor identifying unit 454 determines that the visitor is unidentifiable, based on the in-showroom image, the robot movement instruction unit 457 instructs the guide robot 3 to move to the visitor's location so as to dispatch the guide robot 3 to the visitor who has been determined to be unidentifiable. For example, upon reception of an input of a control signal, indicating that the visitor is unidentifiable, output from the visitor identifying unit 454, the robot movement instruction unit 457 instructs the guide robot 3 to move to near the person that has been extracted from the in-showroom image by the visitor identifying unit 454 so as to dispatch the guide robot 3. This makes it possible to collect an image of an unidentifiable visitor, to identify a visitor, based on a newly acquired image, or to collect image data of a visitor who has visited for the first time. In this case, the robot movement instruction unit 457 instructs the guide robot 3 to conduct an action of encouraging the visitor who has been determined unidentifiable to change the position or the posture so that the visitor becomes identifiable from the in-showroom image to be acquired by the in-facility image acquisition unit 451. For example, the robot movement instruction unit 457 instructs the guide robot 3 to move so that the visitor who has been determined unidentifiable takes a position or a posture facing the imaging apparatus 11.

Further, the robot visual line instruction unit 453 instructs directions of the pair of dummy eyes 306 of the guide robot 3, so that the visual line of the visitor can be guided to encourage the visitor to change the position or the posture. For example, it is preferable to take an action of moving the directions of the line of sight of the pair of dummy eyes 306 toward the imaging apparatus 11, so that the visual line of the visitor is guided toward the imaging apparatus 11. In this situation, for example, the robot movement instruction unit 457 causes the guide robot 3 to make a rotating action or the like in conjunction with the movements of the line of sight, so that it becomes easier to guide the visual line of the visitor.

In addition, the robot visual line instruction unit 453 controls the pair of dummy eyes 306 of the guide robot 3 to look at the direction of the visitor's face that has been detected by the imaging unit 34, so that the visitor can feel as if the visitor makes eye contact with the guide robot 3. Accordingly, even when the visitor's face moves during the conversation between the visitor and the guide robot 3, it is possible to follow the dummy eyes 306 of the guide robot 3, and the visitor can feel relieved, because the guide robot 3 is listening to the visitor.

First Example

Figure 5:
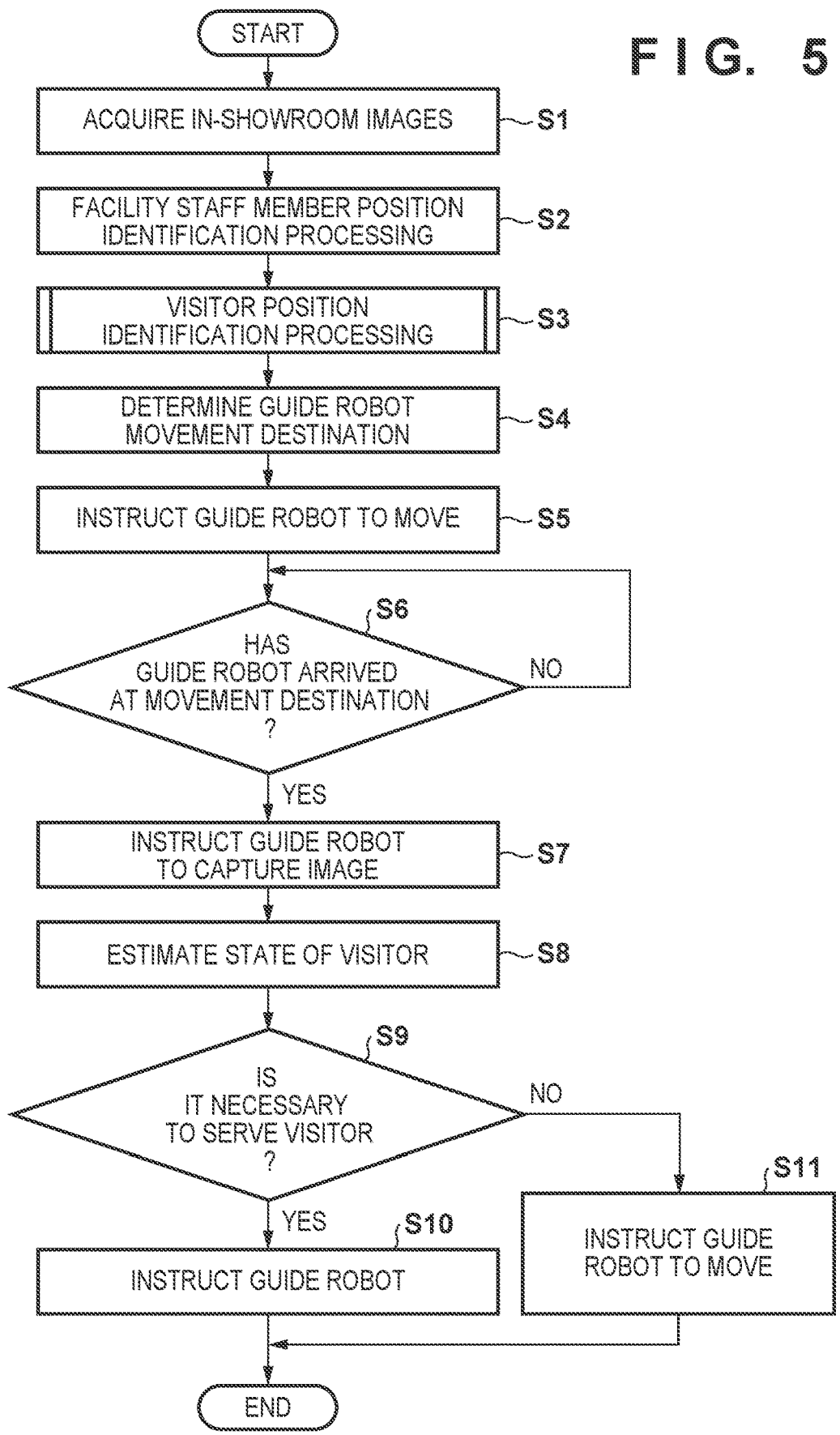
FIG. 5 is a flowchart illustrating an example of a robot dispatch processing performed by the control server.
Figure 8:
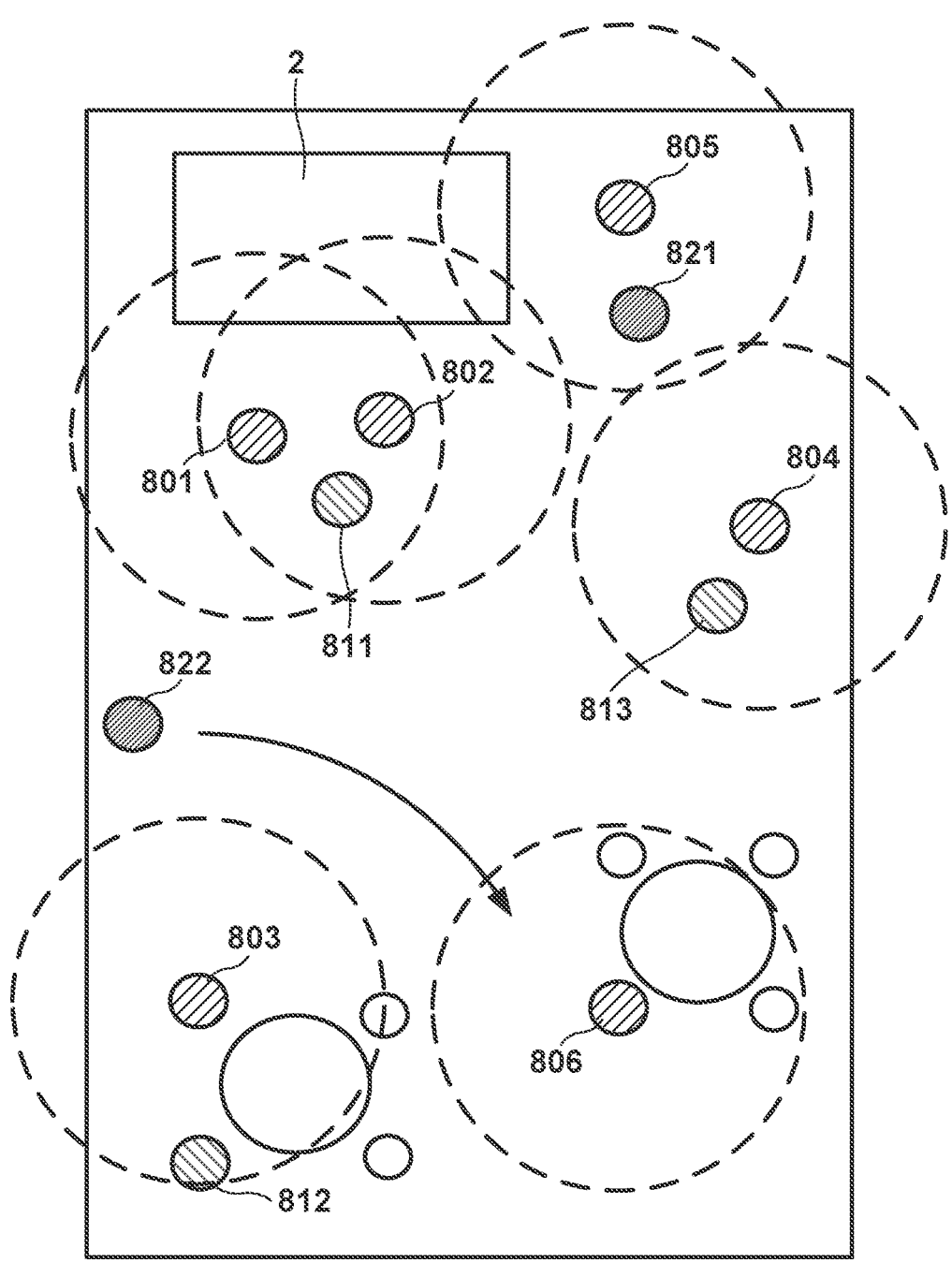
FIG. 8 is a diagram illustrating a positional relationship between a visitor and a facility staff member.

FIG. 5 is a flowchart illustrating an example of a guide robot dispatch processing performed by the control unit 45 of the server device 4 in FIG. 3. FIG. 6 is a flowchart illustrating an example of a visitor identification processing performed by the control unit 45 of the server device 4 in FIG. 3. FIG. 7 is a diagram illustrating an example of a table in which a user state used in processing of specifying the state of the visitor and a score indicating a necessity for serving are associated with each other. FIG. 8 is a diagram illustrating an example of a positional relationship between the visitors and the facility staff members. The processing illustrated in FIG. 5 is started, for example, when the showroom 1 is opened, and is performed at predetermined time intervals until the showroom 1 is closed.

As illustrated in FIG. 5, first, step S1 (referred to as S1. Subsequent processing steps will be referred to in a similar manner), the in-facility image acquisition unit 451 transmits imaging instructions respectively to the plurality of imaging apparatuses 11 installed in the showroom 1, causes the imaging apparatuses 11 to capture the images in the showroom, and acquires the in-showroom images. In this case, the showroom image and the identifier of the imaging apparatus 11 that has captured the image are acquired together.

Next, in S2, the position of a facility staff member is identified. For example, in S2, by calculating the similarity between the face image of the person who appears in the in-showroom image acquired in S1 and the face image of the facility staff member stored in the facility staff member DB 444, it is possible to determine in which image the facility staff member appears. Alternatively, by comparing an image of a person who appears in the in-showroom image with an image of a marker of a facility staff member such as clothes or an accessory, it is possible to determine in which image the facility staff member appears. In addition, the position of the facility staff member is determined, based on the imaging apparatus 11 that has captured the image in which the facility staff member appears and the position and the orientation of the facility staff member. Note that, as described above, in a case where the facility staff member carries the transmitter, the position of the facility staff member may be determined without use of the image that has been acquired by the imaging apparatus 11.

Note that, when the position of the facility staff member is identified in S2, based on the in-showroom image, the facility staff member identifying unit 455 may also identify the direction of the facility staff member's face. Accordingly, it is possible to identify which visitor the facility staff member is serving.

Subsequently, in S3, the server device 4 identifies the position of the visitor, based on the in-showroom image acquired in S1. For example, in S3, by comparing the face image of the person who appears in the in-showroom image acquired in S1 with the face image of the visitor stored in the visitor DB 443, it is possible to determine in which image the facility staff member appears.

In S3, as illustrated in FIG. 6, first in S31, the visitor identifying unit 454 performs processing of extracting a person present in the facility from the in-showroom image acquired in S1. Here, the imaging apparatus 11 corresponding to the in-showroom image from which the person is extracted is identified. Next, in S32, the control server 4 acquires the face image of the visitor from the visitor DB 443. In one example, profile information such as gender or age of the visitor may be acquired in S32. That is, in S32, visitor information with which the visitor is identifiable is acquired. Next, in S33, which visitor is located at which position is identified from the visitor information acquired in S32 and the in-showroom image acquired in S31. For example, it is possible to identify which position the person is located from the imaging apparatus 11 that has captured the in-showroom image from which the person has been detected and the orientation of the imaging apparatus 11. In addition, by calculating the similarity between the face image of the person in the in-showroom image and the face image included in the visitor information in the image processing, it is possible to determine that the visitor of the face image having the highest similarity is present in the showroom.

Note that in a case where the face image of the person cannot be extracted from the in-showroom image, only the position of the visitor may be identified. The guide robot 3 may be instructed to move to the position, and the face image of the visitor may be acquired from the imaging unit 34 of the guide robot 3, so that the visitor may be identified, based on the face image that has been received from the guide robot 3.

In S3, the visitor identifying unit 454 may also identify the orientation of the face of the visitor that has been identified. This enables acquisition of the direction on which the visitor is focusing.

Note that, in a case where the server device 4 recognizes that a specific visitor is present in the facility through the reception or the like, a face image of the visitor recognized to be present in the facility may be extracted beforehand, and the image that has been acquired by the imaging apparatus 11 may be compared with the face image of the visitor that has been extracted. This enables identification of the visitor at high speed.

Subsequently, in S4, the server device 4 identifies a visitor who is not served by any facility staff member from the positional relationship between the facility staff member and the visitor identified in S2, and determines to move the guide robot to the visitor's location as a movement destination. Here, with reference to an example of the positional relationship between facility staff members and visitors illustrated in FIG. 8, a description will be given with regard to processing of identifying a visitor who is not served by any facility staff member.

In FIG. 8, six visitors 801, 802, 803, 804, 805, and 806, facility staff members 811, 812, and 813, and guide robots 821 and 822 are present in a facility.

Here, the facility staff member 811 is talking with the visitors 801 and 802, the facility staff member 812 is talking with the visitor 803, the facility staff member 813 is talking with the visitor 804, and the guide robot 821 is guiding the visitor 805.

In this case, any of the facility staff members 811 to 813 and the guide robot 821 is located within each of predetermined ranges of the visitors 801 to 805 respectively indicated by dotted lines. In this manner, by identifying the positions of the visitors, the facility staff members, and the guide robots, it is possible to detect that neither the facility staff member nor the guide robot is serving the visitor 806. Therefore, the control server 4 is capable of determining the guide robot 822 to be dispatched to the visitor 806. Note that the predetermined range may be a circle with a radius of three meters or so with the visitor as the center, or may be on the visual line of the visitor with a distance of five meters or less from the visitor. The predetermined range can be optionally set for each system.

Note that, in a case where there are a plurality of visitors with no facility staff member present nearby, the guide robot 3 may sequentially move to near the plurality of visitors. Accordingly, one guide robot 3 is capable of serving a plurality of visitors. In such a case, the control server 4 may instruct the guide robot 3 to move to a visitor's location, which is close to the position of the guide robot 3. Alternatively, in a case where a waiting time of the visitor, such as a remaining required time that takes until a product or a service is provided to each visitor or a staying time after the visitor visits the facility, can be acquired from the visitor DB 443 of the control server 4, a control signal may be transmitted so that the guide robot 3 moves to the visitor's locations successively in accordance with a longer waiting time. Accordingly, the guide robot 3 is capable of preferentially serving a visitor with a longer staying time or a visitor estimated to wait for a long time from now on, so that it is possible to prevent the visitors from feeling uncomfortable due to the length of the staying time.

Subsequently, in S5, the robot movement instruction unit 457 transmits a control signal to the guide robot 822 so that the guide robot 822 moves into a predetermined range near the visitor. In one example, the control signal includes a movement destination of the guide robot, that is, position information on a visitor who should be served. In another example, the control signal includes movement route information on the guide robot 822 including a section that is the predetermined range near the visitor.

Note that the guide robot 3 does not need to stop near the visitor. The control server 4 may perform the subsequent processing in S6 to S9 while the guide robot 3 is passing near the visitor. This prevents the visitor from feeling an intimidated due to the guide robot 3 stopping near the visitor.

Note that in S5, the control server 4 may instruct the guide robot to capture an image by the imaging unit 34 at predetermined time intervals and to transmit the image to the control server 4. This enables estimation of the emotion of the visitor, as will be described later in S7 and subsequent steps, even while the guide robot 3 is moving.

Subsequently, in S6, the control server 4 determines whether the guide robot 3 has moved to the predetermined range near the visitor. For example, during the processing in S6, the control server 4 continuously acquires the position in the showroom of the guide robot 3, and calculates a distance to the position of the visitor identified in S3, so as to be capable of determining whether the guide robot 3 has moved to near the visitor. The predetermined range near the visitor may be, for example, a predetermined range within three meters from the visitor, or may be a range within five meters from the visitor and in which the visitor's face can be captured by the imaging unit 34.

When it is determined that the guide robot 3 has moved to near the visitor (Yes in S6), the control server 4 advances the processing to S7, and causes the imaging unit 34 of the guide robot 3 to capture an image of the visitor. Accordingly, even in a case where the visitor is unidentifiable from the in-showroom image that has been acquired from the imaging apparatus 11, the image in which the visitor appears can be acquired at a closer distance, so that the accuracy of visitor identification by the control server 4 can be improved.

Subsequently, the control server 4 advances the processing to S8, and estimates the state of the visitor, based on the image that has been acquired by the guide robot 822. The image acquired in S8 may be a still image or a moving image.

For example, in S8, the state of the visitor may be estimated, based on the expression of the visitor such as a grimace face or a smiling face, or the state of the visitor may be estimated, based on a predetermined gesture such as folding arms or shaking legs. This enables the control server 4 to determine that it is necessary for the guide robot 822 or the facility staff member to serve quickly, so that the service can be smoothly provided before the visitor feels uncomfortable.

Further, for example, in S8, the control server 4 may specify the remaining amount of the food or the drink that has been provided to the visitor. For example, in an automobile dealer or the like, a light meal such as a drink or a snack is provided to the visitor, in some cases, until the facility staff member serves or while the visitor is waiting for the service such as vehicle inspections. In such a case, after the visitor had the drink, the visitor may feel like having more drink. Therefore, the control server 4 specifies the remaining amount of the drink of the visitor, based on the image that has been acquired from the guide robot 3, so that the control server 4 can determine whether it is necessary to additionally provide the drink to the visitor.

Next, the control server 4 advances the processing to S9, and determines whether the guide robot 3 has to serve the visitor.

For example, it is determined whether the remaining amount of the drink of the visitor specified in S8 is smaller than a predetermined threshold. Alternatively, it is determined whether the visitor is looking around. In such a case, it is possible for the guide robot 3 to receive a request for more drink or to provide information about something in which the visitor is interested. Therefore, it is possible to determine that the guide robot 3 needs to serve the visitor. On the other hand, when the visitor is smiling or operating a smartphone, it is determined that the guide robot 3 does not need to serve the visitor.

In one example, in S8, the necessity of serving the visitor may be set beforehand as a numerical value for every expression or gesture of the visitor, the numerical values may be summed up in accordance with the expression or gesture of the visitor, and it may be determined that the visitor needs to be served when the sum exceeds a threshold.

FIG. 7 illustrates an example of a table of user's states and scores respectively indicating the necessities of serving associated with the user's states. The table illustrated in FIG. 7 is stored in the storage unit 44 of the control server 4. In the example of FIG. 7, in a case of smiling, talking, making a phone call, or operating a smartphone, it is better for the guide robot 3 not to serve. Therefore, the necessity of serving takes a negative value. On the other hand, in a case of crying with tears, looking around, shaking legs, having a remaining amount of the drink equal to or smaller than the threshold, or having an angry face, it is better for the guide robot 3 to serve the visitor. Therefore, the necessity of serving takes a positive value. Among these items, when the sum of the items corresponding to the visitor is 10 or more, it may be determined that the visitor needs to be served. Note that the user's states and scores illustrated in FIG. 7 and the threshold used for determining that the visitor needs to be served can be appropriately set in accordance with the type of facility and the service to be provided.

When it is determined that the guide robot 3 needs to serve (Yes in S9), the control server 4 advances the processing to S10, and instructs the guide robot 3 to serve the matter that has been determined that the guide robot 3 needs to serve. For example, the dummy eyes 306 displayed on the display unit of the guide robot 3 can be displayed so as to pay attention to the drink of the visitor. This makes it possible to encourage the visitor to have more drink. In this case, the control server 4 may reproduce audio guidance such as "would you like something more to drink?" from a speaker (not illustrated) of the output unit 33 of the guide robot 3. Accordingly, the guide robot 3 knows that the remaining amount of the drink of the visitor has become small, and is capable of encouraging the visitor to have more drink.

In addition, in a case where the control server 4 determines in S9 that the guide robot needs to serve because the visitor is looking around, the dummy eyes 306 displayed on the display unit of the guide robot 3 may be displayed to pay attention to the visitor, and voices such as "can I help you with something?" may be reproduced from a speaker (not illustrated) of the output unit 33.

On the other hand, in a case where the control server 4 determines that the guide robot 3 does not need to serve (No in S9), the control server 4 advances the processing to S10, and transmits a control signal to move the guide robot 3 from the predetermined range near the visitor.

As described above, according to the present embodiment, the control server instructs the guide robot to move to the visitor's location where no facility staff member is present in the surroundings, so that it is possible to grasp the situation of the visitor who cannot be seen by the facility staff member. In addition, it is possible to prevent the visitor from feeling unnoticed without being served. Accordingly, the visitor can stay in the facility comfortably.

Furthermore, according to the present embodiment, the guide robot captures an image of the visitor after moving to near the visitor. This enables determination that it is necessary to offer more drink to the visitor or to determine that the visitor feels uncomfortable.

Second Example

In the first example, the description has been given with regard to the processing of dispatching the guide robot to a visitor without any facility staff member present in the surroundings. However, even in a case where no facility staff member is present near the visitor but the visitor desires to be served, the visor may not desire to communicate with the guide robot in some cases. In a second example, a description will be given with regard to processing of determining whether the guide robot should interfere with a visitor, based on an image of the visitor that has been captured by the guide robot.

Note that descriptions of the processing, configuration, and function similar to those in the first example will be omitted.

Figure 9:
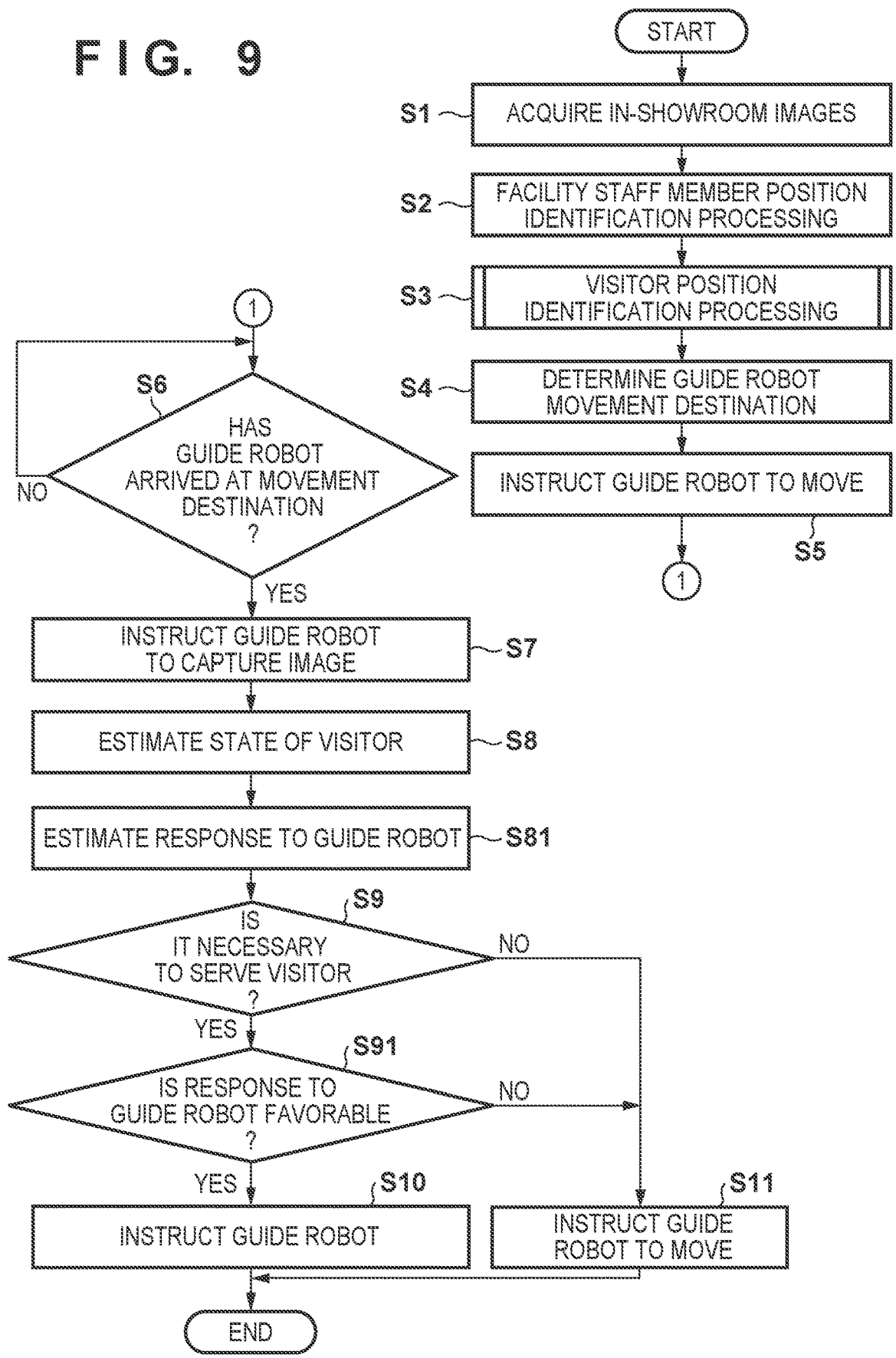
FIG. 9 is a flowchart illustrating an example of the robot dispatch processing performed by the control server.

FIG. 9 illustrates processing according to the second example. Note that the processing in S1 to S8 is similar to those in the first example, and thus the descriptions will be omitted.

In S81, the control server 4 estimates a visitor's response to the guide robot 3, based on the image of the visitor captured in S7. For example, the visual line of the visitor is estimated, based on the image acquired in S7, and it is determined whether the guide robot 3 is located on the visual line of the visitor.

Subsequently, in S9, it is determined whether the visitor needs to be served. In a case where it is determined that the visitor needs to be served, the control server 4 advances the processing to S91, and determines whether the response to the guide robot is favorable.

For example, in a case where it is determined in S81 that the guide robot 3 is located on the visual line of the visitor, it is determined that the visitor is interested in the guide robot 3, it is determined that the reaction is favorable, and the processing proceeds to S10. Alternatively, in a case where it is determined that the guide robot 3 is located on the visual line of the visitor and the visitor's expression is a smiling face, it is determined that the response is favorable, and the processing proceeds to S10. In another example, in a case where the guide robot 3 is located on the visual line of the visitor and it is determined that the visitor is talking to the guide robot 3, it is determined that the reaction is favorable, and the processing may proceed to S10.

On the other hand, in a case where it is determined in S81 that the guide robot 3 is not located on the visual line of the visitor, it is determined that the visitor is not interested in the guide robot 3, it is determined that the reaction is not favorable, and the processing proceeds to S11. Alternatively, in a case where it is determined in S81 that the guide robot 3 is not located on the visual line of the visitor, and the visitor is continuously talking with another visitor or operating a smartphone even when the guide robot 3 is present near the visitor, it is determined that the reaction is not favorable, and the processing proceeds to S11. In another example, even in a case where it is determined in S81 that the guide robot 3 is located on the visual line of the visitor, when it is determined that the visitor's expression is of anger or a grimacing face, it is determined that the reaction is not favorable, and the processing proceed to S11.

This enables the guide robot 3 to avoid serving the visitor, in a case where the visitor desires to be served by a facility staff member instead of the guide robot 3.

Subsequently, in S10, in a case where the visitor DB 443 of the storage unit 44 stores information with which the required time for providing a product or a service can be specified, the control server 4 may transmit the information to the guide robot 3 to notify the visitor of the remaining required time via the display unit 331 or the speaker. This enables the visitor to know the remaining required time, so the anxiety of the visitor can be mitigated.

As described above, according to the present embodiment, with use of the guide robot 3, which is a limited one, appropriately serving the visitors who visit the showroom 1 in the automobile dealer is achieved. For example, the guide robot 3 is dispatched to the location of a visitor who has been kept waiting for a long time and is in a bad mood so as to communicate with the visitor. Accordingly, it is possible to make the visitor become in a good mood or to prevent the visitor from getting in a worse mood. Accordingly, after that, it is possible for business people of the automobile dealer (for example, a sales person) to smoothly serve the visitor in business negotiation or the like.

In addition, for example, in a case where a large number of the guide robots 3 are arranged in the showroom 1, visitors may feel intimidated, and the costs of the automobile dealer increase. However, the guide robot 3 is dispatched to the visitor who is not served by any facility staff member, so as to enable efficient communication with use of the guide robot 3, which is a limited one.

In addition, for example, it is possible to cause the guide robot 3 to ask the visitor a requirement in advance or to conduct simple guidance. For example, it is possible to cause the guide robot 3 to ask a visitor who has been waiting for a long time or a visitor who is estimated to have a long waiting time about a requirement or the like in advance, or to conduct simple guidance. Accordingly, after that, it is possible for business people (for example, a sales person) to efficiently serve the visitors.

As described above, the control server 4 according to the present embodiment is utilized, so as to enable efficiently and smoothly serving the visitors with use of the guide robot 3, which is a limited one.

Other Embodiments

The invention is not limited to the foregoing embodiments, and various variations/changes are possible within the spirit of the invention.

For example, in S8, the description has been given assuming that the state of the visitor is estimated, based on the image that has been captured by the guide robot 3. In one example, the control server 4 may cause a microphone included in the sensor unit 36 of the guide robot 3 to acquire voices, and may estimate the state of the visitor, based on the voices. This enables estimation of the state of the visitor more accurately, based on a visitor's self-talk, a conversation between the visitors, and words that have been uttered by the visitor to the guide robot 3.

Summary of Embodiments

1. A control device in the above embodiment is a control device (4) that controls a robot (3) capable of self-propelling, the control device including:
a facility staff member identifying unit (455) configured to identify a position of a facility staff member in a facility;
a visitor identifying unit (454) configured to identify a position of a visitor in the facility; and a control unit (457) configured to instruct the robot capable of self-propelling to move, wherein
in a case where the control unit determines that the facility staff member that has been identified by the facility staff member identifying unit is absent within a predetermined range near the visitor that has been identified by the visitor identifying unit, the control unit causes the robot to move into the predetermined range.

This enables the guide robot to be dispatched to a visitor with whom no facility staff member is present nearby, and enables provision of the guide robot that appropriately serves the visitor.

2. In the control device in the above embodiment, the visitor identifying unit identifies the position of the visitor, based on images that have been acquired from a plurality of imaging apparatuses (11).

This enables identification of the position of the visitor with use of an image recognition technology.

3. In the control device in the above embodiment, the facility staff member identifying unit identifies the position of the facility staff member, based on images that have been acquired from a plurality of imaging apparatuses.

This enables identification of the position of the facility staff member with use of the image recognition technology.

4. In the control device in the above embodiment, the facility staff member identifying unit identifies the position of the facility staff member, based on signal intensity of a wireless signal output from a transmitter carried by the facility staff member.

This enables identification of the position of the facility staff member with use of a positioning technology of wireless communication or the like.

5. The control device in the above embodiment further includes
a storage unit (44) configured to store information about a staying time in the facility for every visitor, in which
the control unit causes the robot to move into the predetermined range near a visitor having a long staying time out of visitors that have been identified by the visitor identifying unit.

This enables dispatching of the guide robot preferentially to the visitor who has a long staying time and is likely to feel uncomfortable.

6. The control device in the above embodiment further includes
a robot identifying unit configured to identify positions of a plurality of the robots capable of self-propelling, in which
in a case where the control unit determines that the facility staff member that has been identified by the facility staff member identifying unit and the robot are absent within the predetermined range near the visitor that has been identified by the visitor identifying unit, the control unit causes one of the plurality of the robots to move into the predetermined range.

This enables prevention of the plurality of robots from moving to near the visitor and giving the visitor an intimidating feeling.

7. In the control device in the above embodiment,
the robot includes an imaging unit (34), and
the control unit transmits an instruction for imaging the visitor to the robot that has moved to near the visitor that has been detected by the visitor identifying unit.

This make it possible to identify the state of the visitor who cannot be seen by the facility staff member.

8. In the control device in the above embodiment, the robot includes a display unit (331),
the control device further comprises an image acquisition unit (452) configured to acquire an image that has been captured by the imaging unit of the robot, and
in a case where the control unit determines that an amount of a drink of the visitor is smaller than a predetermined amount from the image that has been acquired by the image acquisition unit, the control unit causes the display unit of the robot to display and notify that it has been determined that the amount of drink is smaller than the predetermined amount.

This makes it possible to encourage the visitor to have more drink.

9. In the control device in the above embodiment, after the robot moves to near the visitor, in a case where the control unit detects that the facility staff member has moved to near the visitor, the control unit instructs the robot to move away from near the visitor.

This enables the facility staff member to take over the service for the visitor from the guide robot.

10. A control method in the above embodiment is a control method performed by a control device that controls a robot capable of self-propelling, the control method including:
identifying a position of a facility staff member;
identifying a position of a visitor; and
instructing the robot capable of self-propelling to move, in which
in the instructing step, in a case where the facility staff member that has been identified by the identifying step is absent within a predetermined range near the visitor that has been identified by the identifying step, the robot is instructed to move into the predetermined range.

This enables the guide robot to be dispatched to a visitor with whom no facility staff member is present nearby, and enables provision of the guide robot that appropriately serves the visitor.

11. A robot control system in the above embodiment includes:
a control device of any one of the above embodiments 1 to 9;
an imaging apparatus capable of communicating with the control device; and
the robot capable of communicating with the control device and capable of self-propelling.

This enables the guide robot to be dispatched to a visitor with whom no facility staff member is present nearby, and enables provision of the guide robot that appropriately serves the visitor.

What is claimed is:

1. A control device that controls a robot capable of self-propelling, the control device comprising:
at least one processor circuit with a memory comprising instructions, that when executed by the processor circuit, causes the processor circuit to:
identify a position of a facility staff member in a facility;
identify a position of a visitor in the facility; and
instruct the robot capable of self-propelling to move, wherein
in a case where it is determined that the facility staff member that has been identified is absent in a predetermined range near the visitor that has been identified, the robot is caused to move into the predetermined range.

2. The control device according to claim 1, wherein the position of the visitor is identified based on images that have been acquired from a plurality of imaging apparatuses.

3. The control device according to claim 1, wherein the position of the facility staff member is identified based on images that have been acquired from a plurality of imaging apparatuses.

4. The control device according to claim 1, wherein the position of the facility staff member is identified based on signal intensity of a wireless signal output from a transmitter carried by the facility staff member.

5. The control device according to claim 1, wherein the instructions further cause the processor circuit to:
store information about a staying time in the facility for every visitor, wherein
the robot is caused to move into the predetermined range near the visitor before another visitor staying a shorter time than the visitor.

6. The control device according to claim 1, wherein the instructions further cause the processor circuit to:
identify positions of a plurality of the robots capable of self-propelling, wherein
in a case where it is determined that the facility staff member that has been identified by and the robot are absent in the predetermined range near the visitor that has been identified, one of the plurality of robots is caused to move into the predetermined range.

7. The control device according to claim 1, wherein the robot includes an imaging unit, and
an instruction is transmitted for imaging the visitor to the robot that has moved to be near the visitor that has been detected.

8. The control device according to claim 7, wherein the robot includes a display unit,
the instructions further cause the processor circuit to acquire an image that has been captured by the imaging unit of the robot, and
in a case where it is determined that an amount of a drink of the visitor is smaller than a predetermined amount from the image that has been acquired, the display unit of the robot is caused to display and notify that it has been determined that the amount of the drink is smaller than the predetermined amount.

9. The control device according to claim 1, wherein after the robot moves to be near the visitor, in a case where it is determined that the facility staff member has moved to be near the visitor, the robot is instructed to move away from the visitor.

10. A control method performed by a control device that controls a robot capable of self-propelling, the control method comprising:
identifying a position of a facility staff member;
identifying a position of a visitor; and
instructing the robot capable of self-propelling to move, wherein
in the instructing step, in a case where the facility staff member that has been identified by the identifying step is absent in a predetermined range near the visitor that has been identified by the identifying step, the robot is instructed to move into the predetermined range.

11. A control system comprising:
the control device according to claim 1;
an imaging apparatus capable of communicating with the control device; and the robot capable of communicating with the control device and capable of self-propelling.

\* \* \* \* \*